(12) United States Patent
Cleenewerck et al.

(10) Patent No.: US 7,947,323 B2
(45) Date of Patent: May 24, 2011

(54) LOW-TRANS FATS FOR CONFECTIONERY AND BAKERY FAT COMPOSITIONS

(75) Inventors: Bernard Cleenewerck, Wachtebeke (BE); Karen Saey, Veldegem (BE); Marij Van Dyck, Gent (BE)

(73) Assignee: Fuji Oil Company, Limited, Osaka (JP)

( * ) Notice: Subject to any disclaimer, the term of this patent is extended or adjusted under 35 U.S.C. 154(b) by 806 days.

(21) Appl. No.: 10/509,271

(22) PCT Filed: Mar. 26, 2003

(86) PCT No.: PCT/BE03/00055
§ 371 (c)(1),
(2), (4) Date: Mar. 28, 2005

(87) PCT Pub. No.: WO03/080779
PCT Pub. Date: Oct. 2, 2003

(65) Prior Publication Data
US 2005/0163909 A1 Jul. 28, 2005

(30) Foreign Application Priority Data
Mar. 26, 2002 (WO) .................... PCT/ BE02/00045

(51) Int. Cl.
*A23D 9/04* (2006.01)
*A23D 7/00* (2006.01)
*C07C 51/36* (2006.01)

(52) U.S. Cl. ........ 426/607; 426/417; 426/549; 426/602; 554/141

(58) Field of Classification Search .................. 426/601, 426/607, 417, 549, 660, 602; 554/141
See application file for complete search history.

(56) References Cited

U.S. PATENT DOCUMENTS

| 3,686,240 | A | | 8/1972 | Kawada et al. |
| 4,161,483 | A | * | 7/1979 | Cahen .......................... 554/145 |
| 5,731,027 | A | | 3/1998 | Cain et al. |
| 5,786,019 | A | | 7/1998 | Cain et al. |
| 5,939,114 | A | | 8/1999 | Cain et al. |
| 6,265,596 | B1 | * | 7/2001 | Harrod et al. ................. 554/223 |
| 2004/0146626 | A1 | * | 7/2004 | Higgins ....................... 426/601 |

FOREIGN PATENT DOCUMENTS

| EP | 0 502 697 A1 | 9/1992 |
| EP | 1 040 761 A1 | 10/2000 |
| JP | 9-316484 | 12/1997 |

OTHER PUBLICATIONS

Defense, E. 1985. JAOCS 62(2)376.*
Minifie, B. W. 1980. Chocolate, Cocoa and Confectioery: Science and Technology. AVI Publishing Company, Westport, CT. p. 80-84.*
Hui, Y. H. 1996. Bailey's Industrial Oil and Fat Products, $5^{th}$ edition, vol. 3. John Wiley & Sons, Inc., New York. p. 370-375.*
Timms, R. E. 2003. Confectionery Fats Handbook. Properties, Production and Application. The Oily Press. Bridgwater, England. p. 63-66.*
Paquot, C. and A Hautfenne. 1985. $7^{th}$ edition. Satndard Methods for the Analysis of Oils, Fats and Deriviatives. International Union of Pure and Applied Chemistry. Blackwell Scientific Publications, Oxford, England. p. v-xvi & 59-70.*
Database WPI XP-002246541, Section Ch, Week 199808.

* cited by examiner

*Primary Examiner* — Carolyn A Paden
(74) *Attorney, Agent, or Firm* — Scully, Scott, Murphy & Presser, P.C.

(57) ABSTRACT

The present invention relates to a process for the production of a fat composition for confectionery or baking applications. According to this process, a starting fat composition containing palm oil or a palm oil fraction and having the following composition: (1) a glyceride composition with—a $S_2U$ content between 47 and 75 wt. %,—a $SU_2+U_3$ content <40 wt. %,—a $S_3$ content between 1 and 15 wt. %,—a diglyceride content of 3 to 12 wt. %, the glyceride contents being expressed as wt. % with respect to the total amount of di- and triglycerides in which S means a saturated fatty acid with A hydrocarbon chain length of 14-24 carbon atoms and U means unsaturated fatty acid with a hydrocarbon chain length of 14-24 carbon atoms and (2) a total content of unsaturated fatty acids of less than 55 wt. %, preferably less than 50 wt. %, more preferably less than 48 wt. %, is subjected to a catalytic hydrogenation so as to obtain a first fat with a trans fatty acid content <wt. %, preferably <10 wt. %, most preferably <5 wt. % and an increase of C18-0 of less than 1 wt. %, preferably less than 0.7 wt. %, more preferably less than 0.4 wt. %. This first fat is incorporated in the fat composition.

55 Claims, No Drawings

LOW-TRANS FATS FOR CONFECTIONERY AND BAKERY FAT COMPOSITIONS

The present invention relates to a process for producing a fat composition suitable for use as confectionery fat or as bakery fat, as described in the preamble of the first claim, to the fat composition as such and to the use of the fat composition in several applications such as confectionery and filling fats, in water-in-oil emulsions and in doughs.

1. BACKGROUND OF THE INVENTION

1.1. Filling Fats and Cream Fats.

A first important application area of confectionery fats is the so-called filling and cream fats. Filling and cream fats are used for the production of for example soft centres for pralines or confectionery bars or for creams used in or on biscuits or wafers. To be suitable for use as a cream and/or filling fat, it is important that the fat has specific properties such as good melting properties in the mouth, good creaminess as well as a stable crystal structure. Several types of fats capable of providing these properties are known in the art.

A first class of fats suitable for use as filling and/or cream fats includes the so-called lauric fats. The lauric fats are derived from coconut oil or palm kernel oil and contain a high amount of lauric and myristic acid. By subjecting these lauric fats to a fractionation and/or a hydrogenation reaction, a lauric fat with a steep SFC-profile can be obtained, i.e. a lauric fat of which the solid fat content (SFC) as a function of temperature is high at room temperature, whereas at body temperature the solid fat content is low and the fat is completely molten. This sharp transition from solid to liquid gives a cool sensation in the mouth. Besides showing a steep SFC-profile, lauric fats show a quick solidification, which is an advantage when used in fillings and creams. Although they are frequently applied in practise, lauric type fats have a number of disadvantages, a major disadvantage being the risk to saponification of the lauric acid upon ageing, involving the occurrence of a bad taste. Another disadvantage of lauric fats is their high saturated fatty acid content, often over 80%, which is considered an important nutritional disadvantage.

A second class of cool melting filling and cream fats is based on fractionated palm oil. Palm oil as such shows a rather flat SFC-curve with a SFC at 20° C. of only 25%, while at 35° C. the SFC is 6%. By subjecting palm oil to a fractionation process a product with steep SFC-profile can be obtained. Fractionation of palm oil is carried out by cooling palm oil to a certain temperature, until a liquid phase containing triglycerides with a the lower melting point and a solid phase containing triglycerides with a higher melting point, is obtained. Reduction of the tailing effect of the SFC curve is achieved by removing the high melting part, which mainly consists of trisaturated triglycerides like tripalmitine. Fats associated with this tailing cause a waxy feeling in the mouth upon eating. In a next stage, through removal of the part with the lower melting temperature, which mainly comprises tri- or di-unsaturated triglycerides like tri-oleine or 1-palmitic 2-3-oleic triglycerides, the SFC at room temperature is increased. The fraction remaining after removal of the higher and lower melting part of the palm oil is commonly indicated by the name PMF (palm mid fraction).

The most important advantages of PMF-based filling and cream fats are their non-lauric nature, the lower content of saturated fatty acids, the fresh melting sensation upon eating and the fact that PMF is a non-hydrogenated fat. A major disadvantage of PMF however resides in the rather long and laborious fractionation process involved, together with the rather low production yields, which renders the product expensive: starting from palm oil only 25-30% of PMF is obtained. The yields of hard PMF obtained via double fractionation are even lower. A further disadvantage is the slow solidification rate of PMF, which necessitates in the confectionery plant the use of devices with high cooling capacities. Besides this, PMF based fats show a risk to re-crystallisation, causing "graininess" of the final product when stored for some time, in particular in case no tempering is applied.

A third type of filling and cream fats is based on hydrogenated liquid oils or hydrogenated olein fractions. This type of fat compositions is characterised by a good creaminess and good melting properties, although they may show less cooling sensation in the mouth, which is typical for the two previous types of fat compositions. Products containing these fats show a quick solidification and a stable texture. In addition to this, hydrogenated liquid oils and olein fractions are less expensive compared to the former products since their raw materials are largely available and their processing is less complicated as compared to palm oil fractionation. The presence of trans fatty acids entails the advantage of improving the crystallisation rate. The big disadvantage of hydrogenated liquid oils and olein fractions however is their too high content of trans fatty acids (TFA), which is a health concern of increasing importance. In fact, trans fatty acids are unsaturated fatty acids. However, they have undesirable effects comparable to or even worse than saturated fatty acids (SFA). This is why there is an interest to not only control the SFA level of a fat composition, but to control also the sum of the TFA and SFA levels. To get products with steep SFC-profiles, the hydrogenation reaction is mostly carried out in the presence of a trans-specific catalyst, for example S-poisoned Ni-catalysts.

From the above, it will become clear that there is a need to a fat composition suitable for use as a confectionery fat or baking fat and to a method for producing such a fat composition. There is a need to a fat composition which preferably is non-lauric, which is characterised by a good melting in the mouth without involving waxiness, which shows a sufficiently high crystallisation rate and has an interesting nutritional profile, which means that the composition should have a low content of both saturated and trans fatty acids. Furthermore it is of interest that the fat composition may be produced at an acceptable cost.

From EP-A-547.651 it is known to use a blend of (i) a non lauric fat, in particular a mid-fraction obtained from wet fractionation of hardened soybean oil containing fat mixtures; and (ii) a liquid, trans-hardened high stability oil, in particular olein fractions obtainable from wet fractionation of hardened soybean oil containing fat mixtures. Thereto, combinations of soybeanoil and palm oil olein are subjected to a trans-selective hydrogenation reaction. In the wet fractionation preferably aceton is used as a solvent, for the trans-selective hydrogenation a sulphided Ni-catalyst is found very suitable. The blends of mid-fractions and olein-fractions of such trans-hydrogenated combinations give filling fats with a minimised waxiness, a steep melting curve and, a steep SFC-profile with N20>40% and N30<8%, and good mouthfeel. However, the trans fatty acid content of these fat composition ranges from 35 to 45%, which is too high.

1.2. Coating Fats and Hard Centre Fats.

Besides the above discussed application of confectionery fats in fillings and creams, there is a second important application area for confectionery fats of a harder type in hard centres and in confectionery coatings and tablets. These include the so called hard butters. Hard centres is understood to designate confectionery centres with a firm texture, that are usually produced by extrusion. Hard butters are characterised by a steep SFC-profile: they have a high solid fat content and are hard at room temperature. At body temperature they melt and their solid fat content becomes negligible. The SFC profile of these confectionery fats is similar to that of cocoa butter, which is the traditional chocolate fat.

Over the years, three main classes of hard butters have been developed for use in coatings or tablets including (i) lauric cocoa butter substitutes, (ii) cocoa butter equivalents (CBE) containing palm oil fractions combined with so-called wild fats like illipe or shea fat, and (iii) non-lauric cocoa butter replacers (NL-CBR) based on trans-specific hydrogenated liquid oils or liquid fractions. These three classes of cocoa butter alternatives correspond to the three classes of filling fats described above.

In general, fillings and creams will be softer than tablets and coatings. The reasons for the higher softness of fillings and creams resides in the higher fat content of these products as compared to tablets and coatings and in the softer nature of the fats contained therein i.e. the lower SFC at room temperature. Both for filling and cream fats and for coating fats it is important to have a steep SFC-profile, which means that at room temperature the SFC should be sufficiently high, whereas at body temperature the SFC should be low, in order to avoid a "waxy" mouthfeel. This explains the similar approach used in the production of filling/cream fats and the so-called hard butters.

Palm fractions used for CBE are typically obtained by wet fractionation, which gives a PMF of better quality as compared to PMF obtained from dry or detergent fractionation, the wet fractionation process however being the more expensive one. In the wet fractionation process use is made of acetone, hexane or any other suitable solvent. The wet fractionation process guarantees a sharp fractionation, with an efficient removal of low melting triglycerides like POO (P=Palmitic acid; O=Oleic acid) and high melting triglycerides like PPP. The wet fractionation is also an efficient process for removing diglycerides from the palm mid fraction, which are to be avoided in CBE products. It is important to mention here that CBEs differ from non-lauric CBR and lauric cocoa butter substitutes in that they are a tempering type of fat, similar to natural cocoa butter. Tempering is a process step in which a molten chocolate mixture is subjected to a temperature conditioning process, in particular the molten chocolate mixture is subjected to a process involving cooling and heating, with the aim of stimulating and maximising crystallisation of the fat in a stable crystalline form.

The production of non-lauric CBR is described by W. Soon in "Specialty fats versus Cocoa Butter" page 189-192. According to W. Soon, liquid oils like soybean oil, rapeseed oil and sunflower oil are suitable raw materials for a hydrogenation process, as well as liquid fractions like highly fractionated palm olein (iodine value >68). However, according to W. Soon, care needs to be taken to carry out the hydrogenation process in such a way as to minimise the production of trisaturated triglycerides (SSS where S=Saturated), as these have a high melting point and induce waxiness. This may be achieved by appropriate selection of the catalyst. Instead of using a conventional catalyst, W. Soon advises to carry out the hydrogenation reaction in the presence of a sulphur poisoned nickel catalyst as this promotes the formation of trans-isomers, which give a steep SFC-profile, formation of SSS isomers being minimised. To produce non-lauric CBR based on palm oil, it is advisable to use as a starting material a palm olein the PPP and PPO/POP content of which is as low as possible. PPP is a trisaturated fatty acid that is naturally present in palm oil. With PPO and POP saturation of one single fatty acid suffices to build trisaturated fatty acids.

The effect of using a sulphur poisoned Ni-catalyst in a hydrogenation reaction of palm olein in stead of a traditional non trans specific Ni-catalyst on palm olein has been described by H. Mori in "Crystallisation and polymorphism of fats and fatty acids" pg 430-431. According to Mori when using a trans specific catalyst, a confectionary fat with a sharp melting curve is obtained, which is not the case when using conventional hydrogenation catalyst.

U.S. Pat. No. 4,205,095 relates to a method for the production of cocoa butter substitutes, according to which a palm mid fraction is subjected to a catalytic hydrogenation reaction in the presence of a nickel, platinum or palladium catalyst. The purpose of the hydrogenation reaction is to extend the possibilities of blending PMF with cacao butter by removing triglycerides containing more than one unsaturated fatty acid ($SU_2$ and $U_3$) as much as possible and by converting polyunsaturated hydrocarbon chains of the fatty acids into mono-unsaturated hydrocarbon chains, thereby reducing the iodine value to 38-45, the linoleic acid content to below 2% and achieving a fat composition with a melting point of between 33-36° C. The cocoa butter substitutes disclosed in U.S. Pat. No. 4,205,095 are meant to be used in chocolate products like tablets or coatings.

From U.S. Pat. No. 3,686,240 a process is known for producing a vegetable fat product which is suitable for replacing at least part of cocoa butter in chocolate, the properties of the vegetable fat product being similar to those of cocoa butter. According U.S. Pat. No. 3,686,240 this vegetable fat product is obtained by subjecting a palm oil middle melting point fraction (PMF) to a hardening process through hydrogenation of the fraction. The fractionation and hydrogenation process are carried out so as to become a fat which upon blending with natural cocoa butter should not soften or get a lower melting point and thus shows full compatibility with cocoa butter. The full compatibility with cocoa butter implies that the product obtained with this process is a tempering type of fat. It is further explained that the palm mid fraction should be prepared by solvent fractionation using a specific solvent.

1.3. Caramel.

A third kind of application of fats in the confectionery area is their use in caramel. Caramel is understood to include both high boiling and soft caramels. Fats give a certain consistency to the caramel, they control chewiness and reduce stickiness. In caramels, traditionally hydrogenated liquid oils such as hydrogenated soybean oil or hydrogenated rapeseedoil are used. Lauric fats like hydrogenated palmkernel or hydrogenated coconutoil can also be used. Because of the too high content of trans fatty acids or saturated fatty acids, there is a need for alternatives having a low trans fatty acid content, showing at the same time a similar melting profile and which may be produced at an acceptable cost for this application as well.

1.4. Margarine and Bakery Products.

Next to the application of fats in confectionery, there is an important use of fats in the preparation of baked goods. Fats employed in bakery dough production may contain high amounts of trans fatty acids, as they are often obtained by partial hydrogenation of liquid oils like soybeanoil, rapeseed oil, sunflowerseedoil, etc. These oils are popular, as they are available in large quantities at attractive prices, and through hydrogenation of the oils a whole range of fats can be produced with different SFC-profiles depending on the texture of the dough one wants to obtain. Hydrogenation not only gives plasticity to the product, but it also increases the stability of the oil. The problem with these liquid oils is however that in the course of the hydrogenation, the high amounts of unsaturated fatty acids present in the raw material, easily isomerise to trans fatty acids. Although these fatty acids provide additional functionality to the fat composition, for example increased crystallisation speed, they are unwanted because of their adverse health effect.

Fats are employed in baking applications as a shortening or as margarine. A shortening can be defined as a functional plastic solid fat prepared by carefully cooling, plasticizing and tempering a blend of molten fats and oils. Margarines relate to a water-in-oil emulsion. Margarines and shortenings have an important functionality in baking: they contribute to the quality of the finished product by imparting a creamy texture and rich flavour, tenderness and uniform aeration for moisture retention and size expansion.

2. OBJECT OF THE INVENTION

It is an object of the present invention to provide a fat composition for use as a confectionery fat, which is non-lauric, which is characterised by a steep SFC-profile, which shows a good melting in the mouth without involving waxiness and a sufficiently high crystallisation speed, which has an interesting nutritional profile, i.e. has a low content of trans fatty acids and a sufficiently low content of saturated fatty acids, and which may be produced at an acceptable cost, with respect to raw material cost, process cost, yield, etc.

Another object of this invention is to provide a fat composition which is suitable for use in fillings and in creams and a fat composition for use in caramel, to replace fats containing high levels of trans fatty acids or saturated fatty acids.

It is a further object of the present invention to provide a fat composition which is suitable for use in confectionery centres, confectionery coatings and tablets, the fat composition being suitable to fully or partially replace fats with a high trans fatty acid content, while maintaining a steep SFC-profile without creating waxiness, whereby the confectionery product can be prepared without necessitating tempering step.

Still another object of the present invention is to provide a fat composition having a low content of trans fatty acids, the fat composition being suitable for use in the preparation of bakery doughs and baked products

3. DESCRIPTION OF THE INVENTION

We have now found that a fat composition suitable for use as confectionery fat or as bakery fat, can be obtained subjecting a starting fat composition containing a palm oil or a palm oil fraction to a catalytic hydrogenation reaction as described in the characterising part of the first claim.

The starting fat composition is characterised by
(1) a glyceride composition with
   a $S_2U$ content between 47 and 75 wt. %
   a $SU_2+U_3$ content <40 wt. %
   a $S_3$ content between 1 and 15 wt. %
   a diglyceride content of 3 to 12 wt. %
   the glyceride contents being expressed as wt. % with respect to the total amount of di-and triglycerides
(2) and a total content of unsaturated fatty acids of less than 55 wt. %, preferably less than 50 wt. %, more preferably less than 48 wt. %.
The starting fat composition is subjected to a catalytic hydrogenation until a hydrogenated first fat is obtained which is characterised by a trans fatty acid (TFA) content of less than 15 wt. %, preferably less than 10 wt. %, more preferably less than 5 wt. %, and by an increase of saturated C18 fatty acids of less than 1 wt. %, preferably less than 0.7 wt. %, more preferably less than 0.4 wt. %. The hydrogenated first fat is incorporated in the fat composition. The amount of the first fat incorporated in the fat composition may vary within wide ranges and may even be 100 wt. %.

In the above, S means saturated fatty acid with a hydrocarbon chain length of 14-24 carbon atoms, and U means unsaturated fatty acid with a hydrocarbon chain length of 14-24 carbon atoms.

As a starting fat composition preferably use is made of a fat composition containing palm oil, a palm oil fraction, or blends containing high amounts of palm oil based fats, preferably >70 wt. %. Suitable starting compositions include middle fractions obtained from the fractionation of palm oil.

Starting fat compositions of particular interest for use in confectionery and bakery fats are characterised by
(1) a triglyceride composition with
   a $S_2U$ content of between 50-70 wt. %, preferably 53-65 wt. %
   a $SU_2+U_3$ content of between 15-35 wt. %, preferably 20-32 wt.%
   a $S_3$ content of between 1.5 and 12 wt.%, preferably 2-10 wt. %, most preferably 2.5-7 wt. %
(2) and a total content of unsaturated fatty acids of <55 wt. %, preferably <50 wt. %, more preferably <48 wt. %.

In the present invention it is preferred to keep the content of unsaturated fatty acids in the starting material as low as possible, with the aim of reducing the risk to the formation of trans fatty acids in the course of the hydrogenation reaction.

In case use is made of a palm oil fraction, this fraction will mostly show a steeper SFC-curve than palm oil. Palm oil as such is a suitable raw material for the fractionation. However when envisaging the use in confectionery or bakery fats, the crystallisation rate of the palm oil fraction has been found to be still too slow. The inventor has found that the crystallisation rate may be improved and a product with an even steeper SFC may be obtained, provided the palm fraction is subjected to a hydrogenation reaction under the conditions described above. In that way a first fat with the above-described properties may be obtained.

The starting fat composition used to obtain the first fat with the above described method of this invention, has a higher content of high melting triglycerides, low melting triglycerides and diglycerides as compared to a traditional high quality PMF. In practise this means that the process of the present invention allows producing first fats suitable for use as confectionery fat or as bakery fat out of a cheap starting fat. To obtain a fat suitable for use as a confectionery or baking fat, there is thus no need to specifically select a high quality palm oil or palm oil mid fraction PMF. Moreover, in the process of this invention there is no need to use as a starting fat composition a palm oil fraction which has been subjected to a fractionation process implying severe requirements in terms of clean separation of olein and stearin fractions. In fact, in the process of this invention it is preferred to use a starting fat composition comprising a palm oil fraction obtained through dry fractionation in stead of wet fractionation, although the latter is known to have a better separation efficiency. All these factors contribute in obtaining a first fat with the desired properties for use in confectionery and bakery fats, at an acceptable cost. Besides the palm oil fraction, the starting fat composition may comprise fats or fat fractions of other origin, provided the glyceride composition of the characterising part of claim 1 is met.

The fact that a fat composition with the above-described composition and properties may be obtained is surprising in view of the teaching by W. Soon. According to this teaching a fat composition containing a high amount of $SU_2$ (eg. POO) in combination with a certain amount of $S_3$ and a high amount of $S_2U$ (eg. POP/PPO), as is the case with the starting fat composition used in the method of this invention, easily builds high melting triglycerides upon hydrogenation, leading to a product showing waxiness. The inventor has now found that contrary to the teaching of W. Soon, when starting from a fat composition having the glyceride composition as described in the preamble of claim 1 (i.e. a significant amount of $SU_2$ and a high amount of $S_2U$), a first fat with the desired properties may be obtained: this means a first fat may be obtained which is characterised by a steep SFC-profile, which shows a good melting in the mouth without involving waxiness, combined with a sufficiently high crystallisation speed, which has an interesting nutritional profile, i.e. has a low content of trans fatty acids and a sufficiently low content of saturated fatty acids, and which may be produced at an acceptable cost, with respect to raw material cost, process cost, yield, etc.

This first fat is obtained by subjecting the starting fat composition to a very slight hydrogenation. It has been found that the risk to building of trisaturated triglycerides upon hydrogenation is negligible. This result was found, irrespective of the fact whether the hydrogenation reaction was carried out in the presence of a trans specific or a non-trans specific hydrogenation catalyst.

The inventor has also observed that in the course of the hydrogenation reaction, the formation of trans fatty acids remained within acceptable limits, often negligible.

The hydrogenation reaction will preferably be continued until a product is obtained with an iodine value that differs from the iodine value of the product before hydrogenation by a value of less than 10, preferably less than 5.

The catalyst used in the hydrogenation reaction of this invention may be any hydrogenation catalyst known to the man skilled in the art, for example a nickel, platinum or palladium based catalyst. Preferably however use is made of a Ni-containing hydrogenation catalyst, which is not trans-specific or sulphur poisoned, to limit the formation of trans fatty acids in the course of the hydrogenation reaction as much as possible. Contrary to what could be expected from the teaching of W. Soon and H. Mori, the use of non trans specific catalyst does not result in less steep SFC-profiles, higher melting points or stronger waxiness, provided the raw material starting fat composition which is subjected to the hydrogenation has the above described glyceride composition.

It is furthermore preferred to carry out the hydrogenation reaction at a temperature of between 160-225° C., as in this range the hydrogenation rate is acceptable, the risk to the formation of trans fatty acids and saturated fatty acids being limited.

The first fat obtainable with the process of this invention is characterised by a steep SFC-profile. In fact the difference in SFC value at 20° C. and 35° C. is higher than 35%, preferably more than 40%, the SFC being measured according to IUPAC method 2.150 a.

The first fat obtainable with the process of this invention is further characterised by a crystallisation time at 15° C. of less than 15', to reach 50% of the SFC measured at 15° C.

The first fat obtainable with the process of this invention is a non-temper fat. When blending the first fat of this invention with cocoa butter in certain ratios, the blend will show a softening or decrease in SFC-profile compared to cocoa butter, but it has the advantage that the processing in a confectionery application does not necessitate tempering to have the fat in a stable crystalline form. In this respect the first fat obtained with the process of the invention differs fundamentally from the one described in U.S. Pat. No. 3,686,240.

If so desired, the above-described first fat may be blended with a second fat. Thereto, 1-100% of the first fat may be blended with 99-0% of a second fat. The second fat preferably has a TFA-content of less than 10%, preferably less than 5%. To limit the trans fatty acid content as well as the saturated fatty acid content of the fat composition comprising the first and the second fat, the second fat is preferably a non-hydrogenated fat.

The second fat preferably has an SFC at 30° C. of less than 7% and at 35° C. of less than 4%, as this allows minimising tailing of the SFC profile and thus waxiness of the product. Preferred examples of fat compositions suitable for use as the second fat include palm fractions or liquid oils like for instance sunflower oil, rapeseed oil or soybean oil. Most preferably, the second fat is a palm fraction with an IV of >40, preferably >45, most preferably >50.

Other examples of fats suitable for use as the second fat include olein fractions recovered from the fractionation of palm oil or liquid oil removed in the fractionation process used to produce the starting fat composition. In practise this means that a stearin fraction obtained from the fractionation of palm oil is slightly hydrogenated according to the process of this invention as described above. After the hydrogenation reaction has been terminated, part of the olein fraction is added to the hydrogenated stearin fraction. In that way, starting from a palm oil containing starting material, a fat composition may be obtained with good yield, good melting in the mouth, having a sufficiently high crystallisation speed and a low trans fatty acid-content.

The present invention further relates to confectionery products containing the fat composition obtainable with the process of this invention or confectionery products containing the above described fat composition of the invention.

In particular the present invention relates to confectionery products like fillings, creams and caramel.

In dough applications for baked bakery products the fat phase is very often added in the form of a margarine or a spread. Therefore, the invention also concerns water-in-oil emulsions containing 20-85 wt % of fat, the fat containing an amount of the fat composition obtainable with the process of this invention or an amount of the above described fat composition. Of particular interest is a fat composition comprising an amount of the first fat and an amount of a second fat, the second fat being a non-hydrogenated oil, like a liquid oil or a palm fraction with an IV of more than 40, preferably >45, most preferably >50.

Another aspect of the invention concerns the use of above described water-in-oil emulsions in baking applications, in particular in the phase of the preparation of the dough.

Bakery dough products containing the fat composition obtainable with the process of this invention or containing the fat composition of this invention described above or containing an amount of the above described water-in-oil emulsion of this invention, are also part of the invention.

Baked products, such as for example biscuits, cookies and cakes, obtained by baking a bakery dough of this invention, are a further part of this invention.

Another aspect of the invention concerns confectionery coating fats. Coating fats are understood to comprise harder types of confectionery fats suitable for use in coatings or confectionery bars. To be suitable for this use, the fat must have a good heat resistance, i.e. a sufficiently high solid fat content at room temperature, combined with good melting at body temperature to avoid a waxy feeling in the mouth, upon eating. Such coating fats can be prepared by using the fat composition obtainable with the process of this invention, as from this process fats result with a steep SFC-curve and a good crystallisation speed. To maintain these characteristics of steep SFC-curve and good crystallisation rate, the first fat will rather be combined with an additional fat, having a steep SFC profile. Mostly, the above described second fat will not be used for that purpose. The additional fat preferably has a SFC at 20° C. of at least 50%, preferably at least 60%. The additional fat to be combined with the first fat can be a fat obtained by hydrogenation, fractionation, interesterification or through a combination of two or more of these processes. Examples of such additional fats are hydrogenated liquid oils, hydrogenated and fractionated palm olein, palm stearin or interesterified palm stearin which is subjected to an additional fractionation step, in order to give it a steep SFC-profile. The additional fat is thus by preference a non-lauric fat.

The confectionery coating fat will usually contain at least 15 wt. %, preferably at least 20 wt. % of the fat composition of this invention or the fat composition obtainable with the method of this invention, depending on the envisaged use and properties required for the end product. Depending on the envisaged use, the confectionery coating fat may contain 100 wt. % of the fat composition of this invention, or less than 85 wt. %, less than 75 wt. %, or even less than 60 wt. %

A further aspect of this invention concerns a confectionery fat for hard centres containing the fat composition obtainable with the above described process or containing a fat composition of the invention as described above. Hard centres are understood to comprise in particular confectionery products containing sugar, fat and other possible ingredients like broken or finely grinded nuts, milk powder, cocoa powder, cocoa mass, etc. which are all mixed together and which have a consistency such that the product can be extruded. It is important that the confectionery fat used in these products is hard enough and shows a sufficiently fast crystallisation, as very often these products are produced through extrusion after which they are cooled and cut, followed by enrobing.

The invention also relates to a confectionery fat for hard centres, the fat containing less than 25 wt. % with respect to the total fatty acid content, preferably less than 15 wt. %, most preferably less than 10 wt. % of trans fatty acids.

The invention is further illustrated in the examples and comparative examples given below.

COMPARATIVE EXAMPLE A

A palm oil was dry fractionated into (1) a stearin fraction with an iodine value of 35, and (2) an olein fraction with an iodine value (IV) of 56. The olein fraction yield was 81%. The olein fraction was further dry fractionated into a second stearin fraction and a second olein fraction with IV-value 64.1. The olein yield was 49.9%, when calculated with respect to the original palm oil. The solid fat content (SFC), fatty acid composition (FAC) and triglyceride composition of the thus obtained olein fraction is given in table 1.

To obtain a fat composition with a steep SFC-profile, the olein was subsequently hydrogenated. Two different catalysts were tested, a non-specific and a trans-specific nickel catalyst, respectively the Pricat 9910 and Pricat 9908 (Synetix). The conditions in which the hydrogenation reaction was carried out, are described in table 2. The SFC and FAC of the hydrogenated olein fractions are given in table 1.

As can be seen from table 1, hydrogenation with a trans-specific catalyst (Pricat 9908) gives an olein fraction with a steeper SFC profile as compared to the olein fraction hydrogenated in the presence of the non-specific catalyst (Pricat 9910), which renders the hydrogenated product more suitable for use in filling or cream fat applications. The results of this comparative example are completely in line with the observations by Mori in earlier mentioned literature.

TABLE 1

| Product | Start Palm Olein | hydrogenated Palm Olein n° 1 | hydrogenated Palm Olein n° 2 |
|---|---|---|---|
| IV | 64.1 | 56.5 | 51.1 |
| FAC | | | |
| C12 | 0.32 | 0.32 | 0.30 |
| C14 | 1.02 | 1.00 | 1.00 |
| C16 | 33.93 | 33.79 | 33.50 |
| C18 | 4.09 | 4.34 | 5.06 |
| C18-1 | 45.73 | 55.19 | 56.90 |
| C18-2 | 14.05 | 3.72 | 1.38 |
| C18-3 | 0.17 | 0.00 | 0.00 |
| C 20 | 0.34 | 0.38 | 0.35 |
| TFA | 0.86 | 27.85 | 15.84 |
| SFA | 39.70 | 39.83 | 40.21 |
| TFA + SFA | 40.56 | 67.68 | 56.05 |
| Triglycerides | | | |
| S2U | 30.80 | | |
| SU2 + U3 | 58.63 | | |
| S3 | 0.33 | | |
| Diglycerides | 7.95 | | |
| SFC | | | |
| 10° C. | 0.8 | 72.0 | 65.5 |
| 20° C. | 0.0 | 43.3 | 35.4 |
| 25° C. | 0.0 | 26.5 | 22.0 |
| 30° C. | 0.0 | 14.4 | 11.8 |
| 35° C. | 0.0 | 3.5 | 3.6 |

TABLE 2

| Sample nr | nr 1 | nr 2 |
|---|---|---|
| Amount of fat (kg) | 1.5 | 1.5 |
| catalyst type | Synetix 9908 | Synetix 9910 |
| catalyst amount | 0.4 | 0.10% |
| Reaction-T (° C.) | 180-200 | 180-200 |
| Reaction-P(Bar) | 0.75 | 0.2 |
| Mixer speed (rpm) | 1200 | 1000 |
| H2-consumption (L) | 8 | 13.5 |

EXAMPLE 1

A palm oil was dry fractionated into a first stearin fraction with an IV of 34.4 and a first olein fraction with an IV of 55.4 The olein yield was 84%. Thereafter, the olein fraction was further dry fractionated into a second stearin fraction with an IV 44.9 and a second olein fracton with an IV-value of 63.1. The SFC, FAC and triglyceride-content of the stearin fraction is summarised in table 3. The yield of the second stearin fraction as calculated from the original palm oil is 36.1%. The crystallisation rate of the second stearin fraction is given in table 5.

To obtain a fat with steeper SFC-profile, a better heat resistance and a better crystallisation rate, the thus obtained stearin fraction was hydrogenated, in the presence of the catalysts of comparative example A, i.e. the trans-specific nickel catalyst the Pricat 9908 (sample 3) and the non-specific catalyst Pricat 9910 (sample 4). The hydrogenation conditions are given in table 4, SFC and FAC of the hydrogenated products are given in table 3, solidification rates are given in table 5.

From the results of table 3 it can be seen that sample 3 which had been hydrogenated with a trans-specific catalyst did not show a steeper SFC-profile as compared to sample 4 which had been hydrogenated in the presence of a non-specific catalyst. This result was unexpected in view of the teaching by Mori and comparative example A. From table 3 it further appears that the use of a non-specific catalyst does not give rise to a fat composition with more tailing, which would be unwanted as this creates waxiness. In fact, the characteristics of the fat after fractionation were such that, after a slight hydrogenation the desired properties in terms of SFC and crystallisation rate could be obtained, the formation of unwanted amounts of saturated fatty acids being limited as well as the building of additional amounts of trisaturates. Also both fat compositions, obtained through hydrogenation in the presence of either one of the two catalyst showed similar solidification speeds.

Both samples 3 and 4 are suitable for use in a filling or a cream. However the fat composition hydrogenated with the non-specific catalyst has the advantage of showing a lower TFA-content, the sum of TFA and SFA also being lower.

TABLE 3

| Product | Start 2nd stearin | Nr 3 | Nr 4 |
|---|---|---|---|
| IV | 44.9 | 42.6 | 39.9 |
| FAC | | | |
| C12 | 0.33 | 0.26 | 0.25 |
| C14 | 1.34 | 1.17 | 1.17 |
| C16 | 51.29 | 50.84 | 51.36 |
| C18 | 4.64 | 4.85 | 4.73 |
| C18-1 | 34.87 | 37.10 | 38.62 |
| C18-2 | 6.95 | 5.05 | 3.23 |
| C18-3 | 0.00 | 0.00 | 0.00 |
| C 20 | 0.36 | 0.31 | 0.33 |
| TFA | 0.42 | 7.15 | 4.25 |
| SFA | 57.96 | 57.43 | 57.84 |
| TFA + SFA | 58.38 | 64.58 | 62.09 |
| Triglycerides | | | |
| S2U | 63.63 | | |
| SU2 + U3 | 23.98 | | |
| S3 | 4.46 | | |
| Diglycerides | 5.50 | | |
| SFC | | | |
| 10° C. | 71.9 | 80.4 | 82.0 |
| 20° C. | 43.4 | 58.4 | 61.0 |
| 25° C. | 19.7 | 37.1 | 38.8 |
| 30° C. | 9.2 | 20.5 | 20.8 |
| 35° C. | 3.8 | 9.5 | 9.7 |

TABLE 4

| Sample nr | nr 3 | nr 4 |
|---|---|---|
| Amount of fat (kg) | 1.5 | 1.5 |
| catalyst type | Synetix 9908 | Synetix 9910 |
| catalyst amount | 0.3 | 0.10% |
| Reaction-T (° C.) | 200 | 200 |
| Reaction-P(Bar) | 0.2 | 0.2 |
| Mixer speed (rpm) | 1000 | 1000 |
| H2-consumption (L) | 1.25 | 4.5 |

TABLE 5

| | SFC (*) | | |
|---|---|---|---|
| Time | Start product | Sample Nr 3 | Sample Nr 4 |
| 2.5' | 10.8 | 17.5 | 16.6 |
| 5' | 12.1 | 24.9 | 21.5 |

TABLE 5-continued

| | SFC (*) | | |
|---|---|---|---|
| Time | Start product | Sample Nr 3 | Sample Nr 4 |
| 7.5' | 12.6 | 33.1 | 28.1 |
| 10' | 13.2 | 40.9 | 35.1 |
| 15' | 17.2 | 50.6 | 46.9 |

(*)SFC after complete melting at 80° C. and cooling in water bath at 15° C.

COMPARATIVE EXAMPLE B

A palm oil was dry fractionated to give a first stearin fraction with an IV of 35 and a first olein fraction with an IV of 56. The first olein fraction yield was 81%. The first olein fraction was further dry fractionated into a second stearin fraction with an IV of 45.2 and a second olein fraction. This second stearin fraction corresponds to a palm mid fraction (PMF) with an SFC and FAC as indicated in table 6, sample 5.

The PMF yield with respect to the original palm oil was 28.9%. As can be seen from table 6, the SFC profile of this PMF is sharper as compared to the SFC-profile of samples 3 and 4, thus rendering the PMF fraction especially suitable for use in cream or filling fats. However the fat of sample 5 has a very slow crystallisation speed (table 7), and it is more expensive since the yield of this fraction on the original palm oil is very low. The TFA-content was negligible.

To improve the crystallisation speed 30% of the first stearin fraction was added to 70% of the PMF fraction again (sample 6, table 7). This addition had the effect that the SFC-profile became less sharp (see table 6, sample 6). The SFC of sample 6 is comparable to the SFC of sample 1 of comparative example A, except for the somewhat more expressed tailing at 35° C. for the non-hydrogenated product.

Combining of the first stearin fraction with the palm mid fraction, the yield with respect to the original palm oil, improved to 41.3%.

TABLE 6

| Product | Nr 5 PMF | Nr 6 |
|---|---|---|
| IV | 45.2 | 42.24 |
| FAC | | |
| C12 | 0.31 | 0.26 |
| C14 | 1.18 | 1.14 |
| C16 | 48.20 | 50.62 |
| C18 | 4.60 | 4.88 |
| C18-1 | 37.40 | 35.31 |
| C18-2 | 7.70 | 7.06 |
| C18-3 | 0.00 | 0.00 |
| C 20 | 0.32 | 0.38 |
| TFA | 0.14 | 0.43 |
| SFA | 54.61 | 57.28 |
| TFA + SFA | 54.75 | 7.71 |
| Triglycerides | | |
| S2U | 69.30 | |
| SU2 + U3 | 23.90 | |
| S3 | 0.90 | |
| Diglycerides | 4.13 | |
| SFC | | |
| 10° C. | 69.4 | 71.5 |
| 20° C. | 34.4 | 46.0 |
| 25° C. | 3.7 | 24.3 |
| 30° C. | 0.0 | 14.3 |
| 35° C. | 0.0 | 7.7 |

TABLE 7

| Time | SFC (*) Sample nr. 5 | Sample nr. 6 |
|---|---|---|
| 2.5' | 0 | 14.4 |
| 5' | 1.5 | 15.7 |
| 7.5' | 2.3 | 16.2 |
| 10' | 2.3 | 17.6 |
| 15' | 2.6 | 22.9 |

(*)SFC after complete melting at 80° C. and cooling in a water bath at 15° C.

EXAMPLE 2

Fat compositions of sample 1, 4 and 6 were used to make the following blends:
blend 1: 100% fat sample 1
blend 2: 80% fat sample 4+20% Palm Olein with an IV of 63.1
blend 3: 100% fat sample 6

The palm olein that was added in blend 2 to fat sample 4, was the second olein obtained in the preparation of sample 4 of example 1. The blends showed the properties summarised in table 8.

TABLE 8

| | Blend 1 | Blend 2 | Blend 3 |
|---|---|---|---|
| SFC | | | |
| 10° C. | 72.0 | 71.5 | 71.5 |
| 20° C. | 43.3 | 45.6 | 46.0 |
| 25° C. | 26.5 | 25.3 | 24.3 |
| 30° C. | 14.4 | 13.0 | 14.3 |
| 35° C. | 3.5 | 5.2 | 7.7 |
| Crystrallisation speed at 15° C. | | | |
| 2.5' | 17.5 | 12.2 | 14.4 |
| 5' | 30.0 | 14.9 | 15.7 |
| 7.5' | 35.6 | 19.2 | 16.2 |
| 10' | 39.1 | 24.6 | 17.6 |
| 15' | 43.4 | 32.9 | 22.9 |
| TFA | 27.9 | 3.6 | 0.4 |
| SFA + TFA | 67.7 | 57.9 | 57.7 |
| Yield | 49.9 | 45.1 | 41.3 |

Blends 1-3 were used for the preparation of fillings according to the recipe of table 9 and the following procedure. All dry ingredients were weighed and mixed with part of the molten fat to obtain a kind of "dough". The "dough" had a fat content of 25%. 0.4% of the lecithin was added from the beginning. The dough was passed over a roll refiner to reduce the particle size to 15-20 micron, and homogenised with the remainder of the fat in a mixer with hot jacket for 1 hour. After removing the dough from the mixer, it was cooled to 40° C. and poured into alumina cups. No tempering was applied. The cups were immediately inserted in a cooling device at 12° C. for 30', followed by cooling for another 30' at 15° C. The cups were stored at 20° C.

In the course of the preparation of the dough it was observed that the viscosity and pourability of the different fillings when filling the cups, was virtually the same. All fillings completely solidified after 30' at 12° C.

After storing for 2 weeks at 20° C., the thus obtained fillings were evaluated by a taste panel of 8 persons. For different characteristics a taste score was given from 0 to 4, the score 0 indicating that the characteristic was not present, the score 4 indicating that the characteristic was strongly present. The results are summarised in table 10.

A similar evaluation of the fillings was done after storing for 4 and 8 weeks at 20° C. In the evaluation after 8 weeks, the taste panel was asked which filling they preferred. The results are summarised in table 10.

TABLE 9

| Sugar | 42.9 |
|---|---|
| Cocoa powder | 9.9 |
| Skimmed milk powder | 4.3 |
| Fat | 42.9 |
| lecithin | 0.4 |
| vanillin | 0.1 |

An evaluation of the results of table 10 learns that:
The characteristics of Blend 2, which is a fat composition according to the invention and has a low trans fatty acid content, are comparable to or even better than Blend 1, which has a higher trans fatty acid content. The scores for blend 1 and 2 after 2 and 4 weeks are almost equal; after 8 weeks blend 2 gets even the best score in terms of mouthfeel and waxiness; 7 of the 8 evaluators preferred sample 2 as the best one, 1 evaluator gave an ex aequo to sample 1 and 2. This good result was unexpected.

Blend 3 containing the fat composition of sample 6 which contained virtually no trans fatty acids, gives a much more waxy feeling and a less good melting in the mouth.

TABLE 10

| | Blend 1 | Blend 2 | Blend 3 |
|---|---|---|---|
| After 2 weeks | | | |
| Good mouthfeel | 2.4 | 2.5 | 1.6 |
| Waxiness | 1.4 | 1.5 | 2.8 |
| Graininess | 0 | 0 | 0 |
| After 4 weeks | | | |
| Good mouthfeel | 2.9 | 2.8 | 1.9 |
| Waxiness | 1.1 | 1.5 | 2.3 |
| Graininess | 0 | 0.1 | 0 |
| After 8 weeks | | | |
| Good mouthfeel | 2.4 | 3 | 1.8 |
| Waxiness | 1.1 | 0.8 | 2.3 |
| Graininess | 0.1 | 0.1 | 0.1 |
| Best | 1x | 8x | 0x |

Each of the above tested blends consists of fractions of palm oil, which were hydrogenated or not hydrogenated after having been subjected to a fractionation. The yield of these blends with respect to the original palm oil, the TFA-content as well as the sum of TFA+SFA expressed, are given in table 8.

The results of table 8 indicate that blend 2 according to the invention, may be obtained with a good yield, shows a very low TFA content and a low content of TFA+SFA. Blend 2 did not require the use of a trans-specific catalyst in the hydrogenation reaction to obtain the required characteristics. Blend 2 learns that first removing an olein fraction, followed by hydrogenation of the thus obtained stearin fraction, partial recombination of the olein fraction with the partially hydrogenated stearin fraction gives a fat composition with an interesting SFC-profile, a lower TFA and SFA content and an improved yield. Blend nr 2 was a cream or filling fat of good quality, with a good crystallisation rate and a good nutritional profile, which can be obtained at a reasonable cost. This was the objective of this invention.

Blend 1 is a traditional approach based on a hydrogenated palm olein fraction. To obtain the desired characteristics for Blend 1, it was necessary to carry out the hydrogenation reaction in the presence of a trans specific catalyst, which adversely affected the TFA and TFA+SFA content.

Blend 3 was an attempt to make a "trans fatty acid free" fat composition starting from a palm mid fraction. No hydrogenation at all was done. Although the starting product had a steep SFC-curve, its crystallisation rate was too slow and of a low yield, rendering the product expensive.

To overcome these disadvantages an amount of a stearin fraction was added to the palm mid fraction. The product yield and crystallisation rate could be improved, although the latter remained clearly lower than with blends 1 and 2. Moreover, a new problem was created being the waxiness of the final product. From a nutritional point of view, this blend cannot be considered much better than blend 2 because of its higher saturated fatty acid content and because the sum of TFA and SFA is approximately the same for product 3 and product 2.

EXAMPLE 3

Starting from palm oil, a palm mid fraction was produced by subjecting the palm oil to a fractionation and removing a first stearin fraction and a first olein fraction. The properties of the palm mid fraction (sample 7) are given in table 11, the crystallisation rate is given in table 13. The yield with respect to palm oil was 48.2%, which is much better than the PMF yield of comparative example 2 (sample 5).

To obtain a product with a steeper SFC profile and an improved crystallisation rate, the PMF of sample 7 was slightly hydrogenated with a non-specific catalyst and a trans-specific catalyst. The hydrogenation conditions are given in table 12. Attempts were done to keep the TFA content as low as possible.

The properties of the thus obtained products are summarised in table 11 and 13 (sample 8 & 9). Hydrogenated samples 8 and 9 have almost the same SFC and the same crystallisation rate, although sample 9 had a lower TFA-content as the hydrogenation reaction was carried out in the presence of a non-specific hydrogenation catalyst. This confirms the observations made in example 1: the fat composition obtained by hydrogenation in the presence of a non-trans specific catalyst has a SFC profile with the same steepness and does not show more "tailing" than the product obtained with the trans-specific catalyst. This was not expected from the state of the art.

The two fat compositions 8 & 9 were evaluated for their performance in a cream. The recipe for producing the cream is given in table 14. The same procedure was applied as in example 2. Sample 8 and 9 showed virtually the same behaviour when preparing the creams.

The creams were stored for respectively 1 and 6 weeks and evaluated. A test panel was asked to indicate which one of the samples stored for 6 weeks, they preferred. The results are given in table 15.

TABLE 11

| Product | Nr 7 Mid Fraction | Nr 8 Hydr Mid Frac | Nr 9 Hydr Mid Frac |
|---|---|---|---|
| IV | 48.0 | 46.9 | 45.1 |
| FAC | | | |
| C12 | 0.24 | 0.24 | 0.23 |
| C14 | 1.08 | 1.10 | 1.07 |

TABLE 11-continued

| Product | Nr 7 Mid Fraction | Nr 8 Hydr Mid Frac | Nr 9 Hydr Mid Frac |
|---|---|---|---|
| C16 | 46.49 | 46.99 | 46.64 |
| C18 | 4.74 | 4.83 | 4.76 |
| C18-1 | 38.21 | 39.29 | 41.61 |
| C18-2 | 8.60 | 6.58 | 5.12 |
| C18-3 | 0.08 | 0.00 | 0.00 |
| C 20 | 0.32 | 0.32 | 0.32 |
| TFA | 1.06 | 6.29 | 3.65 |
| SFA | 52.87 | 53.48 | 53.02 |
| TFA + SFA | 53.93 | 59.77 | 56.67 |
| Triglycerides | | | |
| S2U | 55.10 | | |
| SU2 + U3 | 30.20 | | |
| S3 | 4.80 | | |
| Diglycerides | 5.95 | | |
| SFC | | | |
| 10° C. | 61.5 | 68.7 | 69.5 |
| 15° C. | 48.6 | 59.4 | 59.5 |
| 20° C. | 32.4 | 42.2 | 42.9 |
| 25° C. | 15.2 | 24.8 | 24.7 |
| 30° C. | 7.8 | 13.5 | 13.1 |
| 35° C. | 3.7 | 6.5 | 6.2 |

TABLE 12

| Sample nr | nr 8 | nr 9 |
|---|---|---|
| Amount of fat (kg) | 1.5 | 1.5 |
| catalyst type | Synetix 9908 | Synetix 9910 |
| catalyst amount | 0.3 | 0.10% |
| Reaction-T (° C.) | 200 | 200 |
| Reaction-P(Bar) | 0.2 | 0.2 |
| Mixer speed (rpm) | 1000 | 1000 |
| H2-consumption (L) | 0.85 | 3.50 |

TABLE 13

| | SFC (*) | | |
|---|---|---|---|
| Time | Sample nr. 7 | Sample nr. 8 | Sample nr. 9 |
| 2.5' | 9.2 | 13.3 | 13.3 |
| 5' | 10.1 | 15.4 | 15.8 |
| 7.5' | 10.7 | 17.7 | 18.7 |
| 10' | 11.9 | 22.4 | 24.0 |
| 15' | 18.1 | 32.5 | 33.2 |

(*) SFC after complete melting at 80° C. and cooling in a water bath at 15° C.

TABLE 14

| Sugar | 49.5 |
|---|---|
| Skimmed milk powder | 15.0 |
| Fat | 35.0 |
| lecithin | 0.5 |

The results of table 15 show that the creams made with the blend 8 and 9 are equivalent. In both cases a cream with an acceptable mouthfeel, good crystallisation rate and low TFA-content could be obtained. The product with the trans-specific catalyst did not show better sharper melting properties in the mouth. In both cases the product yield with respect to the palm oil was satisfactory which was the objective of the invention. The fat composition of sample 9 produced with a non-trans selective catalyst, has the additional advantage of a very low TFA-content, without being inferior on one of the other characteristics that were judged as important for this application.

TABLE 15

Evaluation of the cream

| Taste evaluation | Sample nr. 8 | Sample nr. 9 |
|---|---|---|
| After 1 week | | |
| Good mouthfeel | 2.6 | 2.5 |
| Waxyness | 1.2 | 1.1 |
| Grainyness | 0.1 | 0 |
| After 6 weeks | | |
| Good mouthfeel | 2.5 | 2.6 |
| Waxyness | 1.5 | 1.3 |
| Grainyness | 0.3 | 0.1 |
| Best | 4x | 4x |

EXAMPLE 4

A mid fraction from palm oil was obtained by dry fractionation and had an IV of 44.1. Other characteristics of this fraction are given in table 16 (product nr 10). This fraction was hydrogenated using a non-specific catalyst, type Pricat 9910. The product thus obtained had an IV of 42.4 and a trans fatty acid content of 3.03 wt% (see table 16, product nr 11). Crystallisation speed of the startproduct and the hydrogenated product are given in table 17.

TABLE 16

| Product | Nr 10 Mid Fraction | Nr 11 Hydr Mid Frac | Nr 12 Hydr Rapeseed |
|---|---|---|---|
| IV | 44.1 | 42.4 | 70.5 |
| FAC | | | |
| C12 | 0.27 | 0.35 | 0.10 |
| C14 | 1.29 | 1.33 | 0.10 |
| C16 | 52.45 | 52.68 | 4.71 |
| C18 | 4.38 | 4.59 | 14.16 |
| C18-1 | 33.62 | 35.25 | 75.96 |
| C18-2 | 6.93 | 4.86 | 1.33 |
| C18-3 | 0.00 | 0.00 | 0.38 |
| C 20 | 0.30 | 0.30 | 0.87 |
| TFA | 0.33 | 3.03 | 39.36 |
| SFA | 59.25 | 59.68 | 20.95 |
| TFA + SFA Triglycerides | 59.58 | 62.71 | 60.31 |
| S2U | 57.12 | | |
| SU2 + U3 | 25.87 | | |
| S3 | 4.53 | | |
| Diglycerides | 4.26 | | |
| SFC | | | |
| 10° C. | 72.4 | 77.9 | |
| 15° C. | 61.0 | 68.6 | |
| 20° C. | 43.9 | 54.0 | |
| 25° C. | 21.6 | 33.0 | |
| 30° C. | 10.7 | 17.1 | |
| 35° C. | 4.9 | 8.7 | |

TABLE 17

| | SFC (*) | |
|---|---|---|
| Time | Sample Nr10 | Sample Nr11 |
| 2.5' | 10.9 | 14.6 |
| 5' | 12.2 | 17.2 |
| 7.5' | 12.7 | 20.8 |
| 10' | 13.0 | 27.1 |
| 15' | 17.6 | 40.4 |

(*) SFC after complete melting at 80° C. and cooling in a water bath at 15° C.

COMPARATIVE EXAMPLE C

Rapeseed oil was hydrogenated, using a non-specific catalyst, type Pricat 9910, until an IV of 70.5. The trans fatty acid content was 39.36 wt %. Other characteristics are given in table 16 (product nr 12). Product 12 is a standard type of hydrogenated fat that can be employed in various applications, among those in bakery.

EXAMPLE 5

Dough fats were made by combining each of the products nr 11 and nr 12 with a double fractionated palm olein (DFPO) with IV 67.4. The combination was done in such a way as to obtain blends with similar SFC-profile. The composition of these blends was following:

Blend 4: 54% product 11+46% DFPO
Blend 5: 60% product 12+40% DFPO (comparative blend)
The SFC-values of these blends is given in table 18 Blend 4 had a trans fatty acid content of 2.4 wt %, blend 5 of 24.1 wt %.

TABLE 18

| | Blend 4 | Blend 5 |
|---|---|---|
| SFC 10 | 48.7 | 44.3 |
| SFC 20 | 21.0 | 19.5 |
| SFC 25 | 10.9 | 10.5 |
| SFC 30 | 5.8 | 4.4 |
| SFC 35 | 1.6 | 0.8 |

To the above described fat compositions two types of emulsifiers were added: respectively 0.3% of distilled mono-acyl glyceride and 0.3% of sorbitan mono oleate. Shortenings were produced in a pilot combinator. A dough was prepared according to following recipe and procedure:

50 parts of shortening and 40 parts of sugar were mixed and whipped so as to obtain a specific gravity of ca 0.85 kg/l
17 parts of whole egg was added and mixed in
100 parts of soft flour were added and mixed till a dough was obtained
the dough was put for 30 min in the fridge to become firm
then the dough was hand kneaded, sheeted and moulded (thickness 4 mm, diameter 45 mm)
the biscuits were baked at 200° C. (7.5-8 min) and cooled for 30 min to room temperature The observations are summarised in the table below:

| | Blend 4 | Blend 5 |
|---|---|---|
| Whipping time needed | 3 min | 1 min |
| Spec. gravity after whipping | 0.83 | 0.85 |
| Appearance of the dough | good plasticity harder than blend 5 | less plastic |
| observations during kneading and sheeting | good plasticity & elasticity less cracking than blend 5 | more soft and crumbly some oiling out more difficult to handle |

-continued

|  | Blend 4 | Blend 5 |
| --- | --- | --- |
| baking time | 8 min | 7 min 30 sec |
| biscuit evaluation | best snap | darker colour softer texture |

The conclusion of this test was that both in product handling and in final result, blend nr 4 was better than blend nr 5. Blend nr 4 is an excellent dough fat and it contains 10 times less trans fatty acids than the comparative blend nr 5.

EXAMPLE 6

A mid fraction from palm oil was obtained by dry fractionation and had an IV of 45.1. Other characteristics of this fraction are given in table 19 (product nr 13). This fraction was hydrogenated using a non specific catalyst, type Pricat 9910. The product thus obtained had an IV of 38.8 and a trans fatty acid content of 8.22 wt % (see table 19, product nr 14). Solidification speed is given in table 20.

COMPARATIVE EXAMPLE D

A non-lauric cocoabutter replacer (NL-CBR) was prepared by blending hydrogenated soybeanoil and hydrogenated double fractionated palmolein, using a trans-specific catalyst, type Pricat 9908.

The thus obtained product had an IV of 70.7, and a trans fatty acid content of 71.61%. Other characteristics are given in table 19 (product nr 15).

TABLE 19

| Product | Nr 13 Mid Fraction | Nr 14 Hydr Mid Frac | Nr 15 NL-CBR |
| --- | --- | --- | --- |
| IV | 45.1 | 38.8 | 70.7 |
| FAC |  |  |  |
| C12 | 0.25 | 0.24 | 0.25 |
| C14 | 0.94 | 0.99 | 0.29 |
| C16 | 48.10 | 49.13 | 14.43 |
| C18 | 4.99 | 5.63 | 7.91 |
| C18-1 | 38.12 | 41.97 | 74.73 |
| C18-2 | 6.68 | 1.79 | 1.53 |
| C18-3 | 0.10 | 0.00 | 0.00 |
| C 20 | 0.38 | 0.08 | 0.38 |
| TFA | 0.60 | 8.22 | 71.61 |
| SFA | 54.77 | 56.19 | 23.26 |
| TFA + SFA | 55.37 | 64.41 | 94.87 |
| Triglycerides |  |  |  |
| S2U | 68.96 |  |  |
| SU2 + U3 | 21.84 |  |  |
| S3 | 1.57 |  |  |
| Diglycerides | 4.59 |  |  |
| SFC |  |  |  |
| 10° C. | 75.0 | 87.0 | 80.7 |
| 15° C. | 63.8 | 80.2 | 79.7 |
| 20° C. | 46.0 | 68.1 | 66.4 |
| 25° C. | 10.1 | 46.1 | 49.9 |
| 30° C. | 1.0 | 24.5 | 28.5 |
| 35° C. | 0.0 | 10.9 | 8.9 |

TABLE 20

|  | SFC(*) | |
| --- | --- | --- |
| Time | Sample Nr13 | Sample Nr14 |
| 2.5' | 0 | 18.3 |
| 5' | 3.6 | 31.2 |
| 7.5' | 4.8 | 41.9 |
| 10' | 5.2 | 50.2 |
| 15' | 5.5 | 59.1 |

(*)SFC after complete melting at 80° C. and cooling in a water bath at 15° C.

EXAMPLE 7

Confectionery centres were prepared according to following procedure and recipe. A first mixture was prepared by mixing 50 parts of sugar, 15 parts of skimmed milk powder and 15 parts of hazelnut paste to a homogeneous blend. After roll refining the blend, the blend was put in a mixer with a heated jacket at a temperature of 40° C. An amount of fat was molten at 45° C. 20 parts of fat were added to the blend and mixed with the other ingredients for 1/2 hour. The mass was removed from the mixer and rolled open in a layer of a thickness of ca.1.5 cm. The layer was let to cool for ½ hour in a refrigerator at 5° C. From this layer centres of 4 cm×4 cm were cut and stored at 20° C.

In this recipe for a centre, two types of fats were tested: in product 14 a hydrogenated palm mid fraction was used, in product 15 a NL-CBR (not according to the invention) was used. The centres were stored for 2 weeks at 20° C. and then evaluated by a taste panel of 8 persons, as described in example 2. The results are given in table 21.

From the results summarised in table 21 it can be concluded that the product containing fat nr 14, according to our invention, was preferred over product 15, which on top of the inferior quality had a high level of trans fatty acids.

TABLE 21

| After 2 weeks | product 14 | product 15 |
| --- | --- | --- |
| Mouthfeel | 2.5 | 1.8 |
| Waxiness | 0.3 | 0.6 |
| Graininess | 0.2 | 0.2 |

COMPARATIVE EXAMPLE E

A non-lauric cocoabutter replacer (NL-CBR) was prepared by blending hydrogenated soybeanoil and hydrogenated double fractionated palmolein, using a trans-specific catalyst, type Pricat 9908. The product thus obtained had an IV of 70.8, and a trans fatty acid content of 63.65wt %. Other characteristics are given in table 22 (product nr 16).

EXAMPLE 8

A non-lauric cocoa butter replacer (NL-CBR) was prepared by blending 80% of the fat described in comparative example E (product nr 16) and 20% of product nr 14. In fact 20% wt. of the high trans NL-CBR were replaced by 20% of the low trans fat nr 14, which is a fat according to the invention, causing a decrease in trans fatty acid content of 11.09 wt %. The product thus obtained is product nr 17.

The SFC-profile of products nr. 16 and 17 is given in table 23. This table shows that the blending of these fats had hardly any effect on the SFC: the high SFC at room temperature, which is needed for the heat resistance of a coating, is maintained and the SFC at 35° C., which is linked to the risk of getting waxiness, does not increase.

TABLE 22

| Product | Nr 16 NL-CBR |
|---|---|
| IV | 70.8 |
| FAC | |
| C12 | 0.38 |
| C14 | 0.38 |
| C16 | 15.91 |
| C18 | 5.82 |
| C18-1 | 76.02 |
| C18-2 | 0.76 |
| C18-3 | 0.00 |
| C 20 | 0.34 |
| TFA | 63.65 |
| SFA | 22.83 |
| TFA + SFA | 86.48 |

TABLE 23

| | SFC | |
|---|---|---|
| Temperature ° C. | Sample Nr16 | Sample Nr17 |
| 10 | 88.9 | 89.1 |
| 20 | 67.3 | 65.2 |
| 25 | 49.6 | 45.6 |
| 30 | 27.3 | 22.8 |
| 35 | 6.2 | 5.5 |

EXAMPLE 9

Confectionery coatings were prepared with the fats nr. 16 and 17 according to the recipe of table 24. Thereby the following procedure was used: first the fat was molten and 1% of sorbitan tristearate was added. All ingredients, except part of the fat, were mixed and roll refined. Then the ingredients were further homogenised with the rest of the fat in a mixer with heated jacket at a temperature of 40° C.

From this coating mixture, tablets were moulded at 45° C., cooled for 30' at 50° C., followed by 30' at 15° C., following which the tablets were un-moulded. No tempering was applied. The tablets were stored in an incubator at 20° C.

TABLE 24

| Coating Recipe | % |
|---|---|
| Fat | 29.2 |
| Sugar | 44.7 |
| Cocoapowder 10/12 | 20.6 |
| Cocoa Mass | 5.1 |
| Lecithine | 0.4 |
| Vanilline | 0.05 |

Tablets were stored for 2 weeks at 20° C. and then evaluated by a taste panel of 8 persons as described in example 2. The results are summarised in table 25.

TABLE 25

| After 2 weeks | product 16 | product 17 |
|---|---|---|
| Mouthfeel | 2.1 | 2.3 |
| Waxiness | 1.2 | 0.9 |

From the results of table 25 it can be concluded that no significant difference was observed between the original NL-CBR and the fat composition in which 20% of the fat was replaced by a low trans fat according to the invention.

EXAMPLE 10

A coating fat was made by subjecting the second stearin used as starting material in example 1 to a hydrogenation reaction applying the reaction conditions of sample 3. However hydrogenation was carried out such that a higher degree of hydrogenation was obtained. The H2-consumption was 2.25 L and the IV of the hydrogenated product was 42.1. Further characteristics of the hydrogenated product are given in table 26 (product nr. 18).

TABLE 26

| Product | Nr 18 Hydr Mid Frac | Nr 19 Hydr Olein |
|---|---|---|
| IV | 42.1 | 55.0 |
| FAC | | |
| C12 | 0.22 | 0.33 |
| C14 | 1.11 | 1.04 |
| C16 | 50.38 | 33.78 |
| C18 | 4.93 | 4.40 |
| C18-1 | 38.33 | 58.72 |
| C18-2 | 3.29 | 0.57 |
| C18-3 | 0.00 | 0.00 |
| C 20 | 0.35 | 0.36 |
| TFA | 11.96 | 36.73 |
| SFA | 57.11 | 40.00 |
| SFC | | |
| 10° C. | 87.7 | 91.3 |
| 20° C. | 69.1 | 70.2 |
| 25° C. | 50.6 | 53.6 |
| 30° C. | 30.9 | 33.8 |
| 35° C. | 17.8 | 15.4 |

COMPARATIVE EXAMPLE F

Similarly, a coating fat was made by subjecting the palm olein of comparative example A (Table 1) to a hydrogenation reaction using the reaction conditions of sample 1. However, the hydrogenation reaction was carried out in such a way that a higher degree of hydrogenation was obtained.

The H2-consumption was 12.6 L and the IV of the product obtained was 55.0. Further characteristics of the hydrogenated product are given in table 26 (product nr. 19).

EXAMPLE 11

With products nr 18 and 19, a coating was made using the recipe summarised in table 27.

The coating was prepared as described in example 9. The coating was then used to cover biscuits of example 5 with dough fat blend 4. The coating was applied to the biscuits at a temperature of 50° C. The coated biscuits were cooled at 10° C. for 10 minutes. All coatings were completely solidified after this cooling and had a nice gloss.

TABLE 27

| Coating Recipe | % |
| --- | --- |
| Fat | 35 |
| Sugar | 49.5 |
| Skimmed Milk Powder | 15 |
| Lecithine | 0.5 |

The biscuits were allowed to rest at 15° C. for 30' and then stored at 20° C. for one week. Evaluation of the coated biscuits after one week storage learned that the coated biscuits had a good appearance and nice eating properties. There was no preference between the biscuit coated with the fat composition nr. 18 or 19. The product coated with the coating made with fat nr. 18 had the advantage over product nr. 19 of containing only a limited amount of trans fatty acids.

EXAMPLE 12

In this example use is made of a mid fraction of palm oil, obtained by dry fractionation of palm oil, the mid fraction having an IV of 45.0. Other characteristics are given in table 28 (product nr 20). This fraction product nr. 20 was subjected to a hydrogenation reaction, so as to obtain a product with an IV of 42.6 (product nr. 21). The trans fatty acid content of the hydrogenated product was 3.81 wt. %.

TABLE 28

| Product | Nr 20 Mid Fraction | Nr 21 Hydr Mid Frac |
| --- | --- | --- |
| IV | 45.0 | 42.6 |
| FAC | | |
| C12 | 0.28 | 0.29 |
| C14 | 1.21 | 1.27 |
| C16 | 50.87 | 51.19 |
| C18 | 4.34 | 4.64 |
| C18-1 | 35.10 | 37.37 |
| C18-2 | 7.23 | 4.14 |
| C18-3 | 0.13 | 0.03 |
| C 20 | 0.33 | 0.30 |
| TFA | 0.29 | 3.81 |
| SFA | 57.36 | 58.31 |
| TFA + SFA | 57.65 | 62.12 |
| Triglycerides | | |
| S2U | 68.58 | |
| SU2 + U3 | 23.32 | |
| S3 | 1.27 | |
| Diglycerides | 4.07 | |
| SFC | | |
| 10° C. | 70.9 | 76.0 |
| 20° C. | 44.8 | 53.3 |
| 25° C. | 9.2 | 26.5 |
| 30° C. | 1.5 | 14.8 |

EXAMPLE 13

A caramel was made using fat nr. 21 of this invention, and fat nr 12, which is a hydrogenated liquid oil, having a high content of trans fatty acids. The recipe of the caramel was as described in table 29.

TABLE 29

| Caramel Recipe | % |
| --- | --- |
| Fat | 15 |
| Glucose syrup (80 Bx) | 34 |
| Granulated sugar | 18.5 |
| Condensed milk(*) | 27.5 |
| SMP | 5 |

(*)25.7% moisture and 56.3% sugar content.

The caramel was prepared by mixing all ingredients together, heating the mixture was for 20-25' to a temperature of 120° C. After having reached the temperature of 120° C. the mixture was immediately cooled to 55° C. and the caramel was moulded and further let to cool down.

The thus obtained candies were evaluated by an evaluation panel. No significant differences were observed between the 2 samples. All samples kept their shape well and no oiling out was observed. Fat nr 21 of the present invention performed well in this application, equally good as the reference fat. However fat nr. 21 of this invention has the advantage of having a much lower content in trans fatty acids.

The invention claimed is:

1. A process for the production of a non-temper fat composition which comprises subjecting a starting fat composition to catalytic hydrogenation in the presence of a nickel, platinum, or palladium based hydrogenation catalyst to a temperature ranging from 160-225° C. until a first fat having a trans fatty acid content of less than 15 wt. % and an increase of C18-0 of less than 1 wt. % is obtained, said first fat being incorporated in the fat composition, wherein said fat composition is a non-temper confectionery fat or bakery fat, and wherein said starting fat composition contains palm oil or a palm oil fraction and has the following composition
   (a) a glyceride composition with
      a $S_2U$ content between 47 and 75 wt. %,
      a $SU_2+U_3$ content <40 wt. %,
      a $S_3$ content between 1 and 15 wt. %,
      a diglyceride content of 3 to 12 wt. %,
      the glyceride contents being expressed as wt. % with respect to the total amount of di-and triglycerides in which S means a saturated fatty acid with a hydrocarbon chain length of 14-24 carbon atoms and U means unsaturated fatty acid with a hydrocarbon chain length of 14-24 carbon atoms; and
   (b) a total content of unsaturated fatty acids of less than 55 wt. %.

2. The process of claim 1, wherein the total content of unsaturated fatty acids is less than 50 wt. %.

3. The process of claim 1, wherein the total content of unsaturated fatty acids is less than 48 wt. %.

4. The process of claim 1, wherein said fat composition is subjected to a catalytic hydrogenation so as to obtain a first fat with a trans fatty acid content of less than 10 wt. %.

5. The process of claim 1, wherein said fat composition is subjected to a catalytic hydrogenation so as to obtain a first fat with a trans fatty acid content of less than 5 wt. %.

6. The process of claim 1, wherein said fat composition is subjected to a catalytic hydrogenation so as to obtain an increase of C18-0 of less than 0.7 wt. %.

7. The process of claim 1, wherein said fat composition is subjected to a catalytic hydrogenation so as to obtain an increase of C18-0 of less than 0.4 wt. %.

8. The process of claim 1, characterised in that the starting fat composition has a glyceride composition with
   (a) a $S_2U$ content between 50-70 wt. %,
   (b) a $SU_2+U_3$ content between 15-35 wt. %, and
   (c) a $S_3$ content of between 1.5 and 12 wt. %.

9. The process of claim 8, wherein the $S_2U$ content is between 53-65 wt. %.

10. The process of claim 8, wherein the $SU_2+U_3$ content is between 20-32 wt. %.

11. The process of claim 8, wherein the $S_3$ content is between 2 and 10 wt. %.

12. The process of claim 11, wherein the $S_3$ content is between 2.5-7 wt. %.

13. The process of claim 1, characterised in that the starting fat composition contains a palm oil fraction obtained through fractionation of palm oil or a fraction thereof, the fractionation being either a dry fractionation or detergent fractionation.

14. The process of claim 1 characterised in that the hydrogenation is continued until a fat composition is obtained with a difference in iodine value before and after hydrogenation of less than 10.

15. The process of claim 14, wherein the difference in iodine value before and after hydrogenation is less than 5.

16. The process of claim 14 characterised in that the difference in iodine value before and after hydrogenation is less than 5.

17. The process of claim 1, characterised in that the hydrogenation reaction is carried out at a temperature ranging between 160-225° C.

18. The process of claim 1, characterised in that 1-100 wt. % of the first fat is mixed with 99-0% of a second fat and in that the mixture is incorporated in the fat composition, the second fat having a trans fatty acid content of less than 10 wt. %.

19. The process of claim 18, wherein the second fat has a trans fatty acid content of less than 5 wt. %.

20. The process as claimed in claim 18, characterised in that as the second fat use is made of a non-hydrogenated fat.

21. The process as claimed in claim 18, characterised in that the second fat has an SFC at 30° C. of less than 7% and at 35° C. of less than 4%.

22. The process of claim 18, characterised in that as a second fat use is made of a palm fraction or a liquid oil.

23. The process as claimed in claim 18, characterised in that as the second fat use is made of a palm fraction having an iodine value above 40.

24. The process as claimed in claim 18, characterised in that as the second fat use is made of a palm fraction having an iodine value above 45.

25. The process as claimed in claim 18, characterised in that as the second fat use is made of a palm fraction having an iodine value above 50.

26. A confectionery product containing the fat composition obtained with the process of claim 1.

27. The confectionery product as claimed in claim 26, characterised in that the confectionery product is selected from the group consisting of a filling and a cream.

28. The confectionery product as claimed in claim 26, characterised in that the confectionery product is a caramel.

29. A water-in-oil emulsion containing 20-85% of fat, characterised in that the fat contains an amount of the fat composition obtainable with the process of claim 1.

30. A bakery dough containing an amount of a fat composition obtainable with the process of claim 1.

31. A baked product obtained by baking a dough containing a fat composition obtainable with the process of claim 1.

32. A confectionery coating fat containing a fat composition obtained with the process of claim 1.

33. The confectionery coating fat according to claim 32, characterised in that the coating fat contains minimum 15 wt % and maximum 100 wt. % of the fat composition.

34. The confectionery of claim 33 wherein the coating fat contains a minimum of more than 20 wt % and a maximum of less than 85 wt. % of the fat composition.

35. The confectionery of claim 34 wherein the coating fat contains a maximum of less than 75 wt. % of the fat composition.

36. The confectionery coating fat as claimed in claim 33, characterised in that the coating fat comprises an amount of an additional fat having a solid fat content at 20° C. of at least 50%.

37. The confectionery coating fat as claimed in claim 36, wherein the additional fat has a solid fat content at 20° C. of at least 60%.

38. The confectionery coating fat as claimed in claim 36, characterised in that the coating fat comprises an amount of an additional fat obtained through hydrogenation, fractionation or interesterification, or a combination thereof, the additional fat being a non-lauric fat.

39. A confectionery coating or tablet containing the confectionery coating fat claimed in claim 32.

40. A hard centre confectionery fat, containing the fat composition obtained with the process of claim 1.

41. The hard centre confectionery fat, as claimed in claim 40, characterised in that the fat contains an amount of trans fatty acids which is less than 25 wt. % with respect to the total amount of glycerides present in the fat.

42. The hard centre confectionery fat, as claimed in claim 41, wherein the fat contains an amount of trans fatty acids which is less than 15 wt. % with respect to the total amount of glycerides present in the fat.

43. The hard confectionery fat, as claimed in claim 41, wherein the fat contains an amount of trans fatty acids which is less than 10 wt. % with respect to the total amount of glycerides present in the fat.

44. A confectionery hard centre containing the confectionery fat according to claim 40.

45. A non-temper fat composition obtained with the process of claim 1, wherein the fat composition resulting from the catalytic hydrogenation of the starting fat composition has a difference in solid fat content at 20° C. versus 35° C. of more than 35%, the solid fat content being measured according to IUPAC method 2.150 a.

46. The fat composition of claim 45, wherein the fat composition has a difference in solid fat content at 20° C. versus 35° C. of more than 40%.

47. The fat composition as claimed in claim 45, characterised in that the fat composition has a crystallisation time at 15° C. of less than 15' to reach 50% of its solid fat content measured at 15° C.

48. The fat composition as claimed in claim 45, characterised in that the composition contains 1-100 wt % of the first fat and 99-0% of a second fat, the second fat having a trans fatty acid content of less than 10 wt. %.

49. The fat composition as claimed in claim 48, characterised in that the second fat is a non-hydrogenated fat.

50. The fat composition as claimed in claim 48, characterised in that the second fat has an SFC at 30° C. of less than 7% and at 35° C. of less than 4%.

51. The fat composition as claimed in claim 48, characterised in that the second fat is a palm fraction or a liquid oil.

52. The fat composition as claimed in claim 48, characterised in that the second fat is a palm fraction with an iodine value above 40.

53. The fat composition as claimed in claim 48, characterised in that the second fat is a palm fraction with an iodine value above 45.

54. The fat composition as claimed in claim 48, characterised in that the second fat is a palm fraction with an iodine value above 50.

55. The fat composition as claimed in claim 48, wherein the second fat has a trans fatty acid content of less than 5 wt. %.

* * * * *